US007783688B2

(12) United States Patent
Huber

(10) Patent No.: US 7,783,688 B2
(45) Date of Patent: Aug. 24, 2010

(54) METHOD AND APPARATUS TO SCALE AND UNROLL AN INCREMENTAL HASH FUNCTION

(75) Inventor: John David Huber, San Diego, CA (US)

(73) Assignee: Cisco Technology, Inc., San Jose, CA (US)

( * ) Notice: Subject to any disclaimer, the term of this patent is extended or adjusted under 35 U.S.C. 154(b) by 483 days.

(21) Appl. No.: 11/271,134

(22) Filed: Nov. 9, 2005

(65) Prior Publication Data
US 2006/0101039 A1    May 11, 2006

Related U.S. Application Data

(60) Provisional application No. 60/522,819, filed on Nov. 10, 2004.

(51) Int. Cl.
G06F 7/00 (2006.01)
G06F 17/30 (2006.01)
G06F 17/00 (2006.01)

(52) U.S. Cl. .............................. 707/999.008; 707/698; 707/747

(58) Field of Classification Search ................ 370/395, 370/366; 711/216, 253, 256
See application file for complete search history.

(56) References Cited

U.S. PATENT DOCUMENTS

| 5,790,569 | A  | * | 8/1998  | Kojima et al. ................ 714/755  |
| 6,237,016 | B1 | * | 5/2001  | Fischer et al. ............... 708/622  |
| 6,311,216 | B1 | * | 10/2001 | Smith et al. .................. 709/226 |
| 7,058,718 | B2 | * | 6/2006  | Fontes et al. ................. 709/228 |
| 2003/0169745 | A1 | * | 9/2003 | Gooch ..................... 370/395.32 |
| 2005/0060535 | A1 | * | 3/2005 | Bartas ........................ 713/154 |
| 2005/0086520 | A1 | * | 4/2005 | Dharmapurikar et al. ... 713/201 |
| 2005/0166046 | A1 | * | 7/2005 | Bellovin et al. ............. 713/165 |
| 2006/0059173 | A1 | * | 3/2006 | Hirsch et al. ................ 707/100 |

OTHER PUBLICATIONS

Estan, C., et al., "New Directions in Traffic Measurement and Accounting", *UCSD Technical Report CS2002-0699*, (Feb. 8, 2002), 62 pgs.

* cited by examiner

*Primary Examiner*—Yicun Wu
*Assistant Examiner*—Yu Zhao
(74) *Attorney, Agent, or Firm*—Schwegman, Lundberg & Woessner, P.A.

(57) ABSTRACT

A method and apparatus speeding up an incremental hash function is described. The method may comprise receiving a data string including a plurality of N data samples and, as each data sample is received, multiplying the data samples to obtain data sample multiplication results and multiplying a current hash value by a constant to obtain a hash multiplication result. Thereafter, the data sample multiplication results are added to the hash multiplication result to obtain new current hash values and a hash value of the data string is defined as the new hash value. In an embodiment, a moving window of length wl may be defined and data samples that were received wl to wl+N bytes previously may be multiplied with the constant raised to the power of w to wl+Nl to obtain n subtraction results.

7 Claims, 9 Drawing Sheets

METHOD AND APPARATUS TO SCALE AND UNROLL AN INCREMENTAL HASH FUNCTION

CLAIM OF PRIORITY

This patent application claims the benefit of priority, under 35 U.S.C. Section 119(e), to U.S. Provisional Patent Application Ser. No. 60/522,819, filed on Nov. 10, 2004, the entire content of which is incorporated herein by reference.

TECHNICAL FIELD

This application relates to a method and apparatus to scale and unroll an incremental hash function.

BACKGROUND

Hash functions may produce a hash value which is a number generated from a string of text. The hash or hash value is substantially smaller than the text itself, and is generated by a formula in such a way so as to reduce the likelihood that some other text will produce the same hash value. Hash functions may be used effectively with multi-stage filters to detect malicious content in packet communicated via a network. A packet or datagram is a piece of a message transmitted over a packet-switching network. An example of a packet-switching network is the Internet where enormous quantities of data are communicated between various network points.

An example of malicious content in a packet is data associated with viruses, computer worms, or the like. In these circumstances, it may be advantageous to identify the content in packets and thus identify the presence of these malicious viruses, worms, or the like. The content in a packet may thus have a "signature" which may identify the content and, when identified, allow appropriate action to be taken to reduce the likelihood of infection. In order to facilitate identification of the signature hash values of the signature may be used.

BRIEF DESCRIPTION OF DRAWINGS

The present invention is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of embodiment of the present invention. It will be evident, however, to one skilled in the art that the present invention may be practiced without these specific details.

In order to expedite processing, it may be desirable for a hash function to have as few collisions (two or more different strings having the same hash function) as possible and also for the hash function to be incremental. In an example embodiment, a Rabin hash function is used to expedite processing. Although the embodiments are described herein, by way of example, to processing a data sample with a length of 1 byte, it will be appreciated that data sample of other lengths may be processed in other embodiments.

For a string of x bytes (a plurality of data samples), the Rabin hash has the form:

$$B_0*k^x+B_1*k^{(x-1)}+B_2*k^{(x-2)}+B_3*k^{(x-3)}+B_4*k^{(x-4)}+B_x$$

where k represents a multiplying constant and $B_0$ through $B_x$ represent the value of the x bytes, respectively, of the string for which the hash function is being calculated.

Because multiplications are slow, in an embodiment the above function is scaled to multiple up to gigabit speeds by essentially computing the Rabin hash for several consecutive portions of the equation in parallel. For example, hash functions for incoming packets in a network may be computed to identify content (e.g., malicious content such as worms, virus detection, or the like) in the packets.

Figure 1:
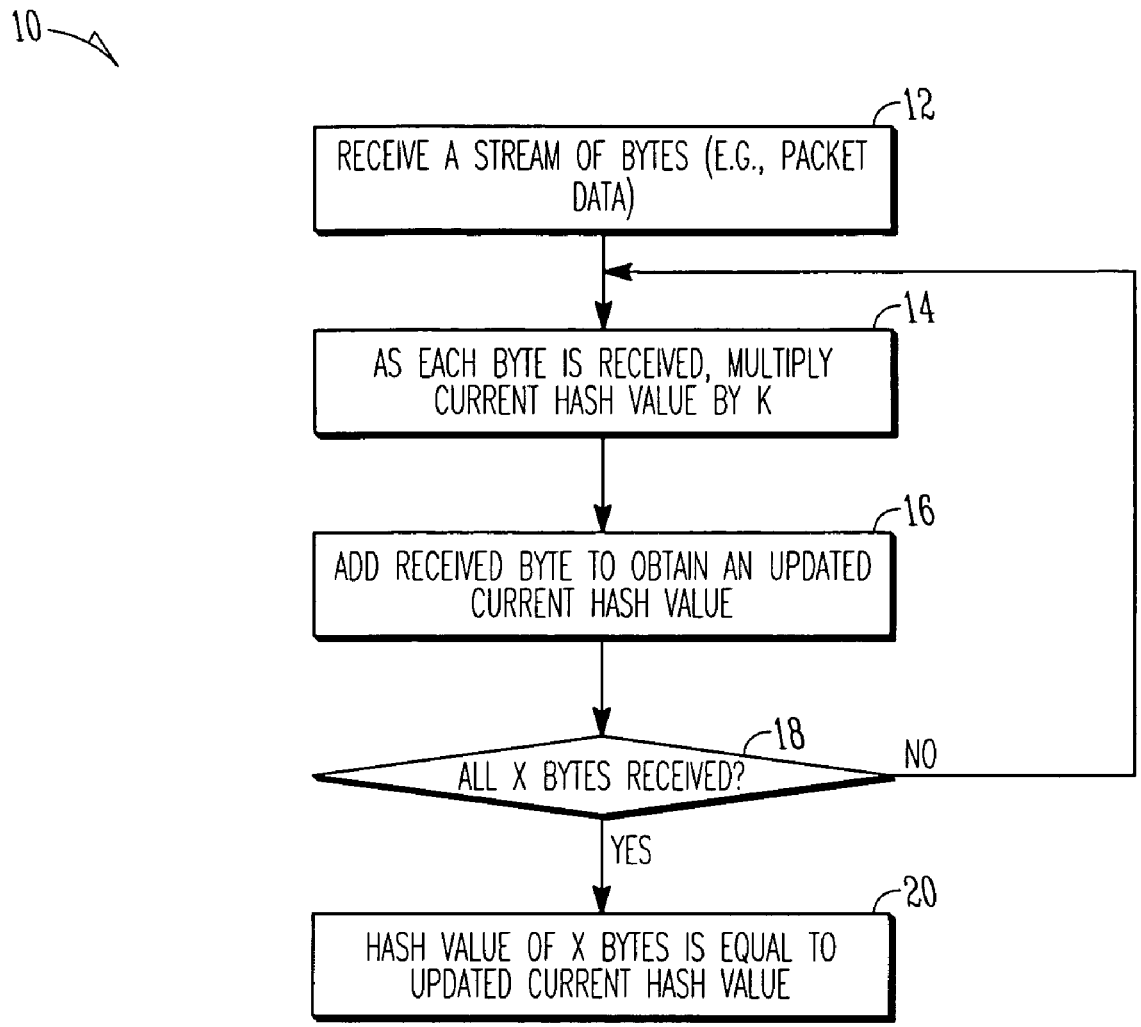
FIG. 1 shows a method, in accordance with an example embodiment, to incrementally calculate hash values.

FIG. 1 shows a method 10, in accordance with an example embodiment, to incrementally calculate or compute hash values. As shown at block 12, as the bytes arrive (e.g., bytes from packets in a network), the Rabin hash function is incrementally calculated for each byte (data sample) by multiplying a current hash value by k (see block 14) and adding the value of the currently arriving byte (see block 16). The sum of the current hash value and the currently arriving byte then define an updated or new current hash value. The method 10 may be represented as follows:

$$H_0=H_0*k+B$$

Where $H_0$ is the current hash value and B is the most current byte.

As shown at decision block 18, the functionality performed in blocks 14 and 16 is carried out until all x bytes have been received where after, as shown at block 20, the hash of the x bytes is provided by the updated current hash value.

By way of illustration, using the method 10 for a string of 10 bytes in length, the hash value would be incrementally calculated in the manner shown in Table 1 below (assuming the initial hash value is 0):

TABLE 1

1. $H_{0new} = B_0$
2. $H_{0new} = B_0*k + B_1$
3. $H_{0new} = B_0*k^2 + B_1*k + B_2$
4. $H_{0new} = B_0*k^3 + B_1*k^2 + B_2*k + B_3$
...
10. $H_{0new} = B_0*k^9 + B_1*k^8 + B_2*k^7 + B_3*k^6 + B_4*k^5 + B_5*k^4 + B_6*k^3 + B_7*k^2 + B_8*k + B_9$ The hash value can also be incrementally calculated for a sliding window of strings of a fixed length. For example, if a string length of 10 is desired, when the 11$^{th}$ byte arrives, after the hash value is multiplied by k and the 11$^{th}$ byte is added, there is a $B_0*k^{10}$ term which must be subtracted from the value.

Figure 2:
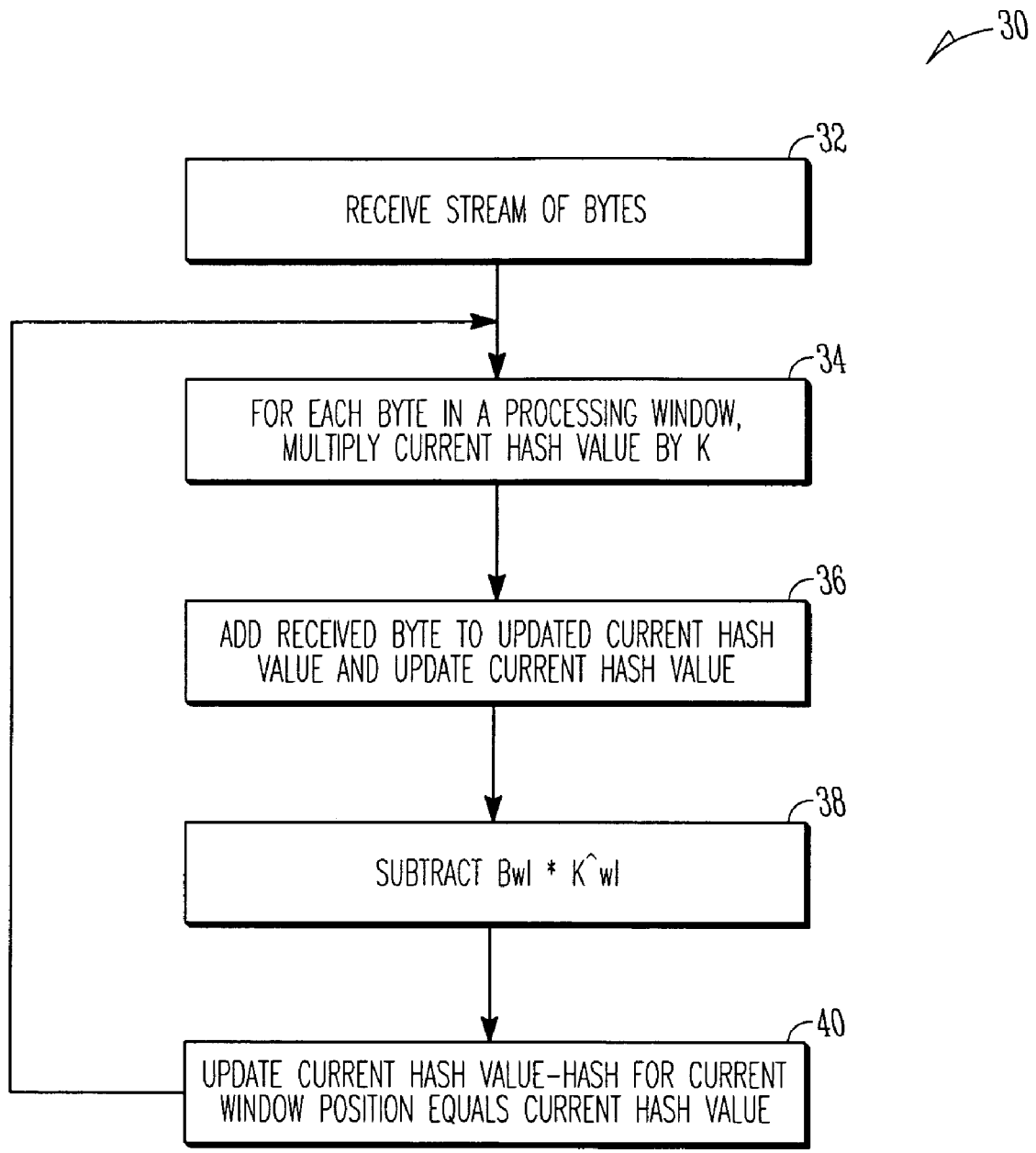
FIG. 2 shows a method, in accordance with an example embodiment, to incrementally calculate hash values with a moving window.

FIG. 2 shows a method 30, in accordance with an example embodiment, to incrementally calculate hash values within a sliding window. As shown at block 32 a stream of bytes (plurality of data samples) may be received. Calculation of the first hash value for the stream of bytes may utilize the method 10. In general for incrementally computing a sliding window hash value for each new byte which arrives, the current hash value is multiplied by k (see block 34), the new byte is added (see block 36), and the $B_x*k^{wl}$ term is subtracted (see block) 38. Thereafter, as shown at block 40, after subtraction of the $k^{wl}$ term an updated or new current hash value obtained. The method 30 may be represented as follows:

$$H_0 = H_0*k + B - B_{wl}*k^{wl}$$

Where $H_0$ is the current hash value, k is the multiplying constant, wl is the window length, B is the byte currently arriving (being received), and Bwl is the byte which arrived wl bytes previously.

Since multiplying is a very time intensive task in hardware, the calculation may not be able to be complete in one clock cycle. If the bytes are arriving one per clock cycle, since each new hash value is dependent on the previous calculation, it is not possible to pipeline this operation. Instead of pipelining, an embodiment unrolls the Rabin Hash function a plurality of times and processes multiple bytes in parallel. To see the advantage of this, if we for example unroll the hash calculation 4 times and process 4 bytes in parallel, this now gives 4 clock cycles to complete the operation instead of just one (assuming that one byte arrives every clock cycle).

Figure 3:
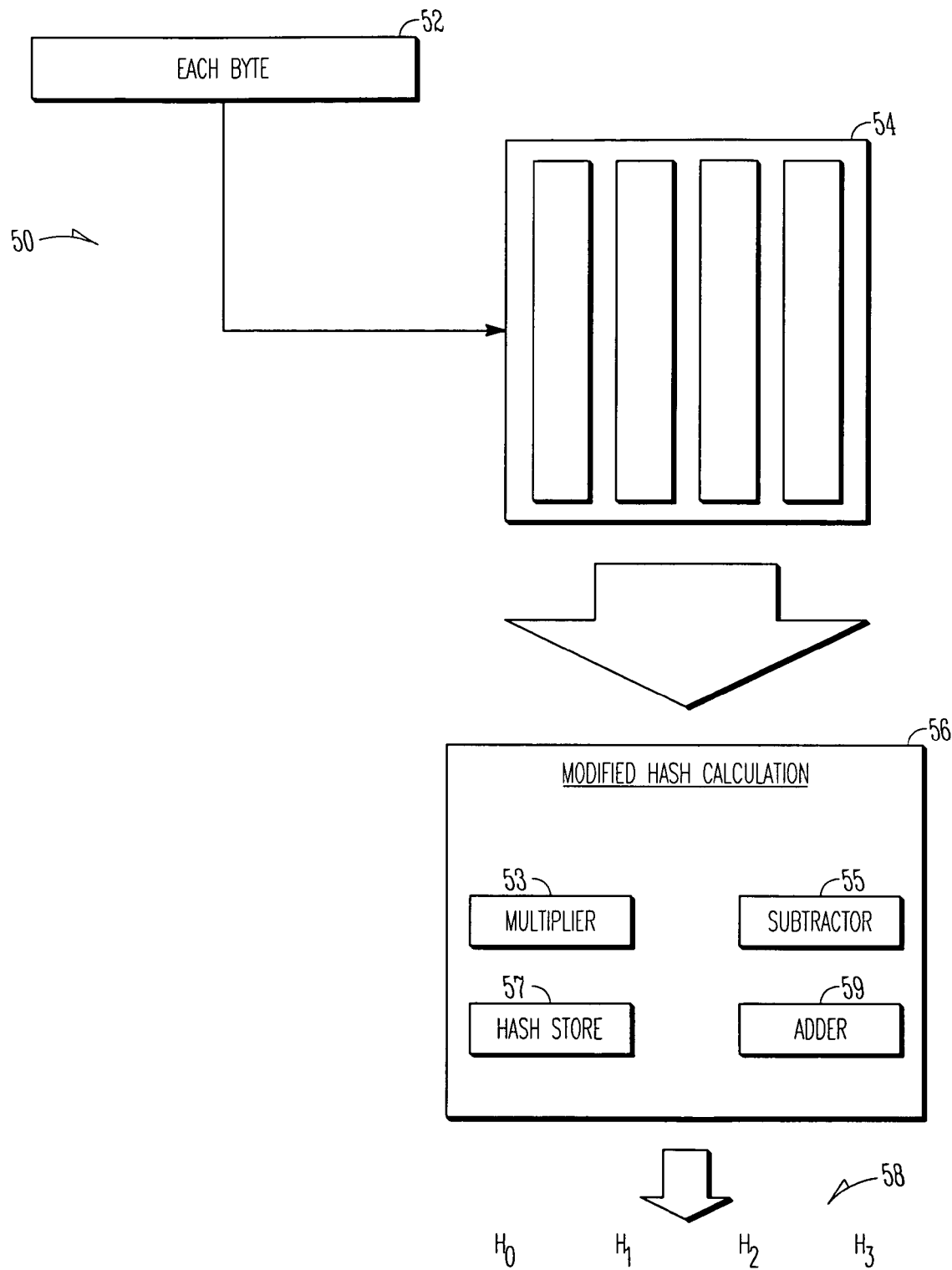
FIG. 3 shows a schematic representation of apparatus, in accordance with an example embodiment, to unroll hash functions.
Figure 4:
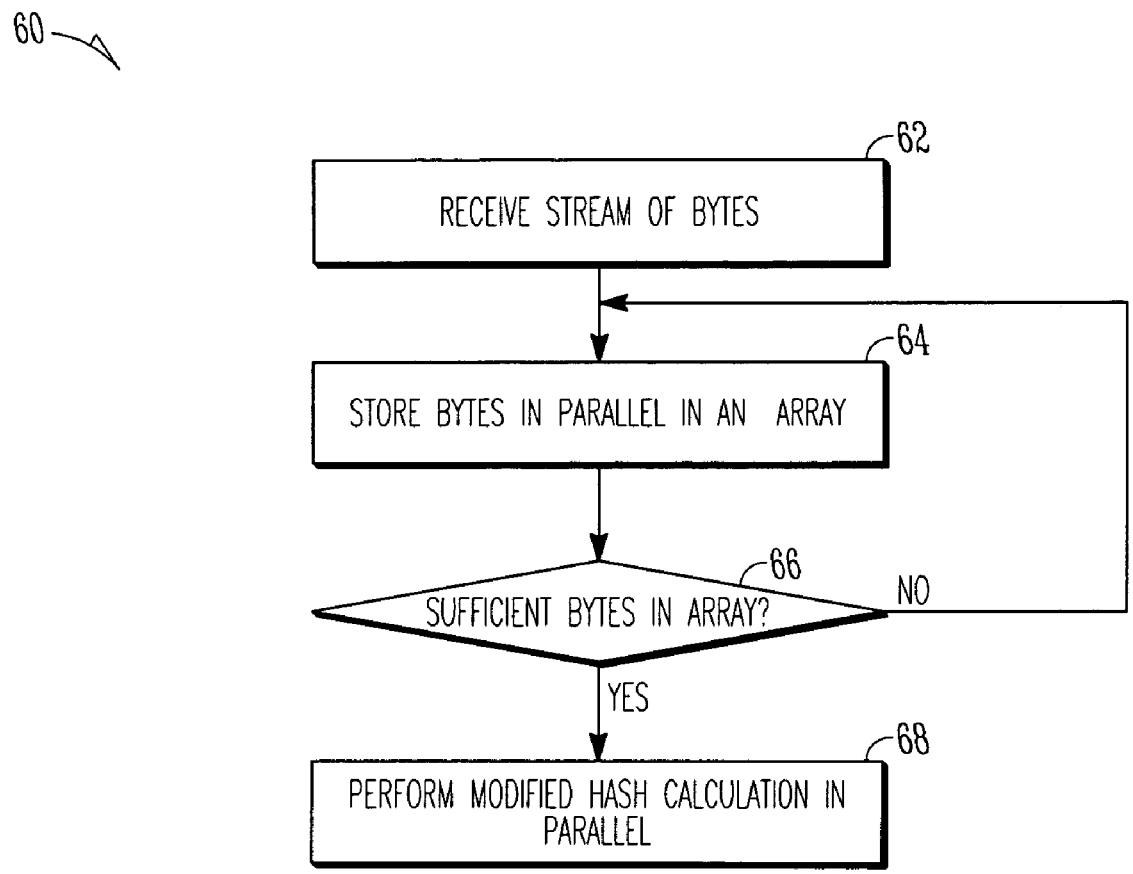
FIG. 4 shows a method, in accordance with an example embodiment, to incrementally unroll hash functions.

To demonstrate unrolling functionality in an embodiment, the following example is provided of unrolling the hash function 4-fold when bytes are being received one byte per cycle. It will however be appreciated that the same principle can be applied to unrolling an arbitrary number of times regardless of the byte arrival rate. Reference 50 (see FIG. 3) shows a schematic representation of apparatus to unroll a hash function in accordance with an example embodiment. FIG. 4 shows a method, in accordance with an example embodiment, for unrolling a hash function. As each byte arrives (see byte 52 in FIG. 3 and block 62 in FIG. 4), it may parallelized or duplicated (see block 64) into an array 54 which, in the given example, is four bytes wide. When four bytes of valid data are present (see block 66), the modified hash calculation (see modified hash calculation module 56) is carried out for the 4 bytes of data in parallel (now only once every 4 cycles) and four hash values ($H_0$-$H_3$) may be computed (see arrows 58). The modified hash function (see blocks 56 and 68) may perform the method 10. The hash calculation may thus be as follows (assuming all initial hash values are 0):

$$H_0 = H_3 + B0$$

$$H_1 = H_3 + B_0*k + B_1$$

$$H_2 = H_3 + B_0*k^2 + B_1*k + B_2$$

$$H_3 = H_3 + B_0*k^3 + B_1*k^2 + B_2*k + B_3$$

In order to perform the functionality described herein, the modified hash calculation module 56 may include a multiplier 53, a subtractor 55, a hash store 57 and an adder 59. It will be appreciated by a person of skill in the art that this calculation will produce the same results as the values shown in Table 1 only now instead of computing one result every cycle, four results are computed every four cycles. It will be appreciated that a different number of arrays may be provided and a different number of hash values may be computed in other embodiments. This allows multi-cycle paths to be used on the registers which store the hash values and, in the given example, provide the hardware 4 times as much time to do the calculations. It will however be appreciated that the size of the array 54 is not limited to 4 segments and that, in other embodiments, a different number of segments may be provided.

The same methodology is applied an embodiment to incrementally compute a hash value for a sliding window of a fixed length string. For example, in an embodiment with a sliding window of 10 bytes (although this can be applied to any length window), the following modifications are be made to the hash value computations to subtract off the high order terms:

TABLE 2

$H_0 = H_3 + B_0 - (B_{10}*k^{10})$
$H_1 = H_3 + (B_0*k + B_1) - (B_{10}*k^{11} + B_{11}*k^{10})$
$H_2 = H_3 + (B_0*k^2 + B_1*k + B_2) - (B_{10}*k^{12} + B_{11}*k^{11} + B_{12}*k^{10})$
$H_3 = H_3 + (B_0*k^3 + B_1*k^2 + B_2*k + B_3) - (B_{10}*k^{13} + B_{11}*k^{12} + B_{12}*k^{11} + B_{13}*k^{10})$

Thus, generally, in an embodiment a method of speeding up an incremental hash function is described. The method may comprise receiving a data string including a plurality of data samples and performing selected processing as each data sample is received. For example, the method may maintain a plurality of hash values, one for each data sample that can be received in parallel. For each hash value, the current hash value may be multiplied by a constant to obtain a hash value multiplication result and, for each data sample, the data sample may be multiplied by a predetermined constant to obtain a sample multiplication result. Thereafter for each hash value, a plurality of sample multiplication results may be added and previously stored sample multiplication results may be subtracted to obtain a new current hash value. In an embodiment, the method stores data samples in parallel in an array including a plurality of segments and, when sufficient data samples are present in the array, performs the multiplying, adding, and defining of the hash value in parallel on each segment of the array.

In an embodiment, method may comprise defining a moving window of length wl; defining a number of hash values H computed concurrently; defining a number of data samples arriving concurrently to also be H; defining the hash multiplier constant to be k; updating the first hash value by adding the first data sample multiplied by the constant k to the last hash value multiplied by k and subtracting the data sample that was received wl bytes previously with the constant raised to the power of wl; updating the second hash value by adding the first data sample multiplied by the constant k raised to the power 2 and the second data sample multiplied by the constant k to the last hash value multiplied by k to the power of 2 and subtracting the data sample that was received wl bytes previously with the constant raised to the power of wl+1, and subtracting the data sample received wl+1 bytes previously raised to the power wl, and updating the I-th hash value by adding the correspondingly multiplied values of the first data samples to the last hash value multiplied by k to the power of and subtracting the correspondingly multiplied values of bytes previously received wl to wl+.

Figure 5:
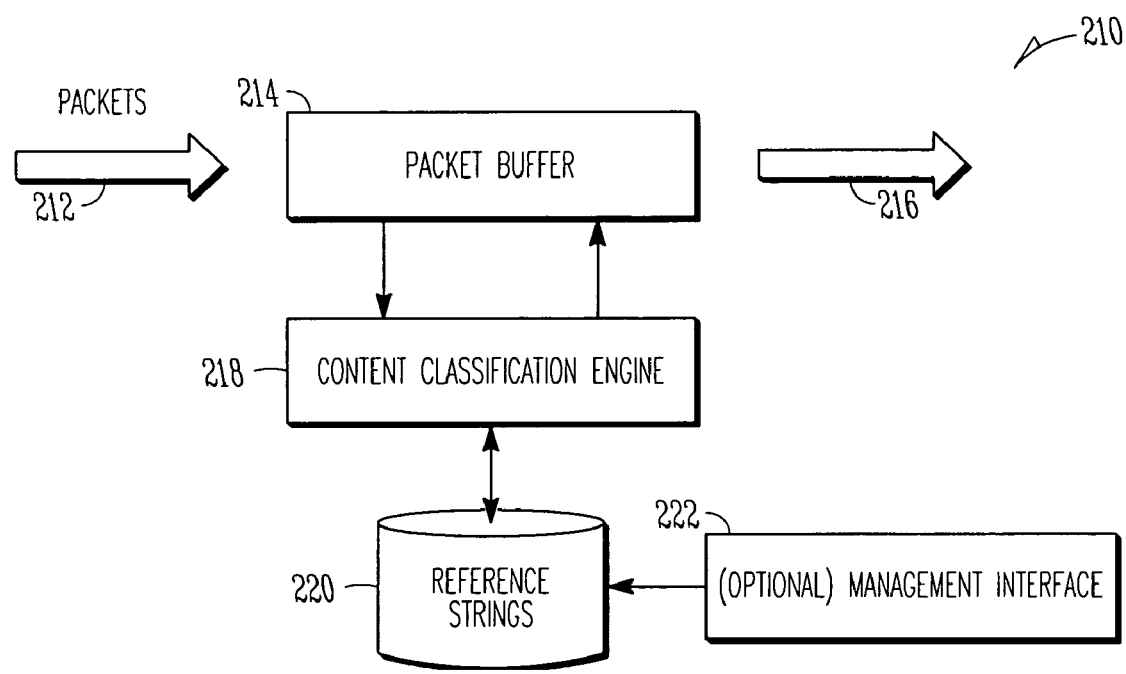
FIG. 5 shows apparatus, in accordance with an example embodiment, to identify or monitor content in a packet.

Referring to FIG. 5, reference 210 generally indicates apparatus, in accordance with an embodiment, to identify or monitor content in a packet. The methods described above may, for example, be deployed in the apparatus 210. The apparatus 210 may be included in a router, a switch, or any other electronic device that processes packets. As shown by arrow 212, a packet stream may be received and each packet may then be stored in a packet buffer 214. Packets from the packet buffer 214 may subsequently be communicated to another device as shown by arrow 216. The apparatus 210 is also shown to include a content classification engine 218, a reference strings database 220 and, optionally, a management interface 222. Broadly, the content classification engine 218 receives data samples in a pre-selected or defined window from each packet received and analyzes or processes the data sample to identify whether or not it contains any one of a plurality of reference string stored in the reference strings database 220. In order to analyze the content in an entire packet, the window is moved sequentially from offset point to offset point within the packet and, in an example embodiment, the window width corresponds to a string length of the smallest reference string in the reference strings database 220. As descried in more detail below, the content classification engine 18 may performs a multi-stage packet analysis process wherein it first identifies packets that could potentially include a relevant string and, thereafter performs subsequent processing in further stages when the likelihood that the string is in fact included in a particular sample is greater. The optional management interface 222 may be used to define the reference strings, update the reference strings, and perform other functionality required to define the reference strings in the reference strings database 220 and, in an embodiment, generate data in a multi-stage filter and bit tree utilized to perform example second and third stages of the processing.

In an embodiment, the reference strings database 220 includes a plurality of reference strings (e.g. 100,000 reference strings) and, each reference string may have a corresponding or associated defined action. It will be appreciated that the particular action may be dependent upon the nature of the particular reference string and the environment in which the apparatus 210 is deployed. For example, where a reference string is used to identify a virus or worm, the action may be specific to prevent infection of any computer system. However, in a content routing environment, where the packet is routed dependent on the content of the packet, the defined action may identify a destination for the packet. For example, actions associated with a particular reference string may include a block action (e.g., any packets that match the string should be destroyed), a TCP reset action (e.g., a TCP reset may be sent to the two ends of the TCP connection that the packet is part of), an alert action (e.g., an alert message (or the entire packet) may be sent to a management station with the information contained in the packet), a log action (e.g., may be similar to an alert action except that the message is sent to a system log file such as syslog), a route action (e.g., the packet may be routed to the destination specified in the action), a rate limit action (e.g., packets containing specified content may be rate limited, e.g. specifying a drop probability within the content string), or the like. It will also be appreciated that a combination of the aforementioned actions (or any arbitrary action(s)) may be associated with any one or more of the strings. These actions may be defined or specified, for example, using the management interface 222. Thus, any reference string may be defined and any appropriate action associated with the reference string may be performed when the reference string is identified in a packet received in an incoming packet stream (see arrow 12).

It should be noted that the manner in which the content classification engine 218 acquires a packet or any data sample forming part of the packet may vary from embodiment to embodiment. For example, in an embodiment where the apparatus 210 is deployed in a router or switch, the apparatus 210 may receive all packets in a packet stream and inspect or process them to identify the presence of any reference strings and, thereafter, pass them to its output (e.g. a forwarding engine on a switch or a router). Accordingly, in an example embodiment, the packets may flow through the apparatus 210. However, in another example embodiment, the apparatus 210 may function in a "tap" mode which taps packets from a packet stream.

In an example embodiment, the content classification engine 218 may predicate or add to packet header data corresponding to an action identified in the reference strings database 220. Thus, the apparatus 210 may then identify a particular action associated with a reference string and include action data corresponding to the reference string with the packet which is then communicated to a further processing device (see arrow 216).

Figure 6:
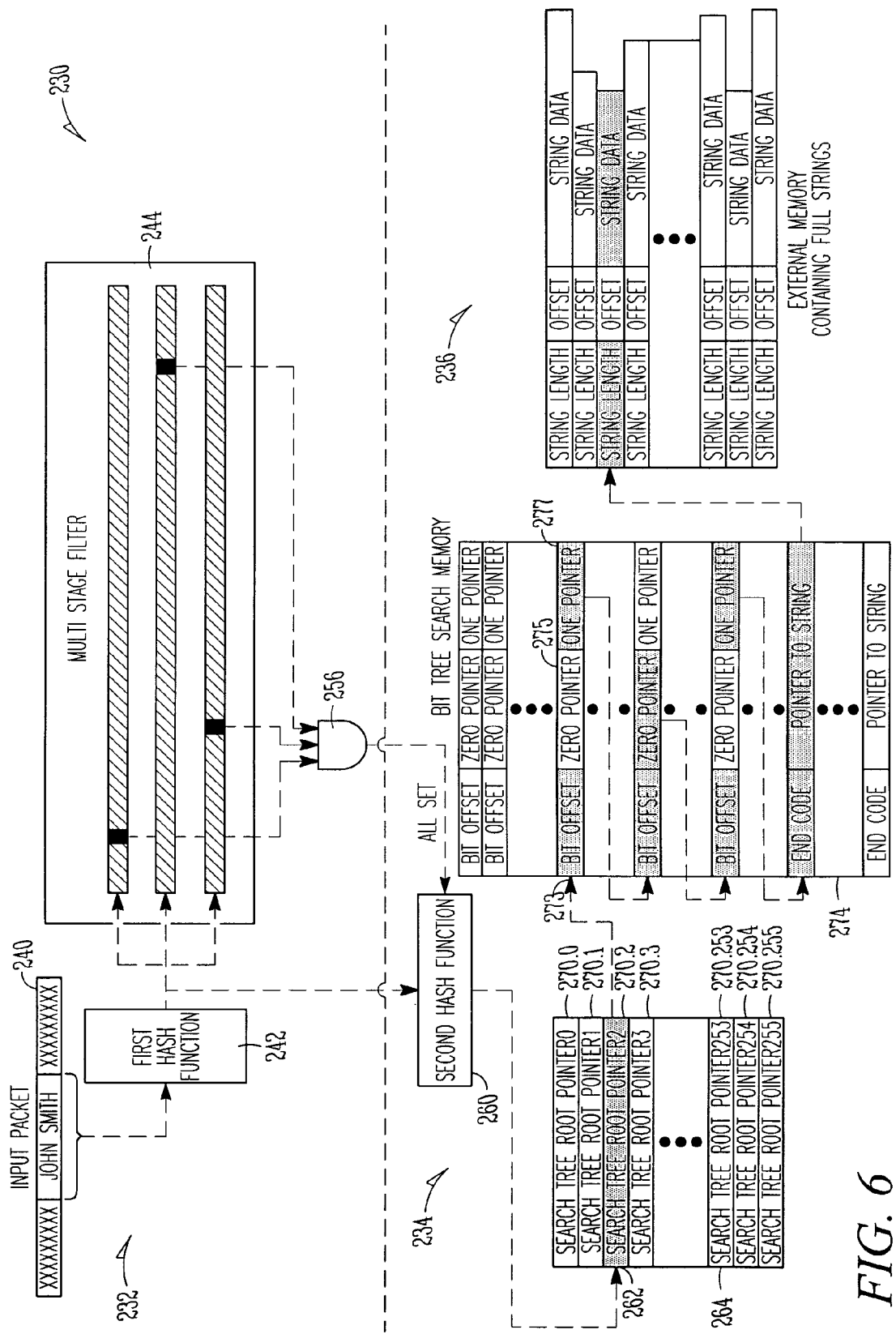
FIG. 6 shows a content classification engine in accordance with an example embodiment.

Referring to FIG. 6, reference 230 generally indicates a content classification engine in accordance with an example embodiment. The content classification engine 230 shown by way of example to include three processing stages. A first processing stage 232 may perform probabilistic offset checking and, if the data sample passes the checking in the first processing stage 232, the functionality of a second processing stage 234 may be performed. Thereafter, if the data sample passes the second processing stage 234, the data sample may then be processed in a third processing stage 36.

In the first processing stage 232, a data sample in a window, which sequentially moves along an input packet 240, is fed into a hash function/component 242 which generates a hash from the data sample and queries a multi-stage filter 244 which has been pre-populated or configured with data corresponding to the reference strings stored in the reference strings database 220. In an embodiment, the hash function/component 242 performs the methods hereinbefore described using Rabin Hash functionality. The configuration of the multi-stage filter 244 is described in more detail with reference to FIG. 7.

Figure 7:
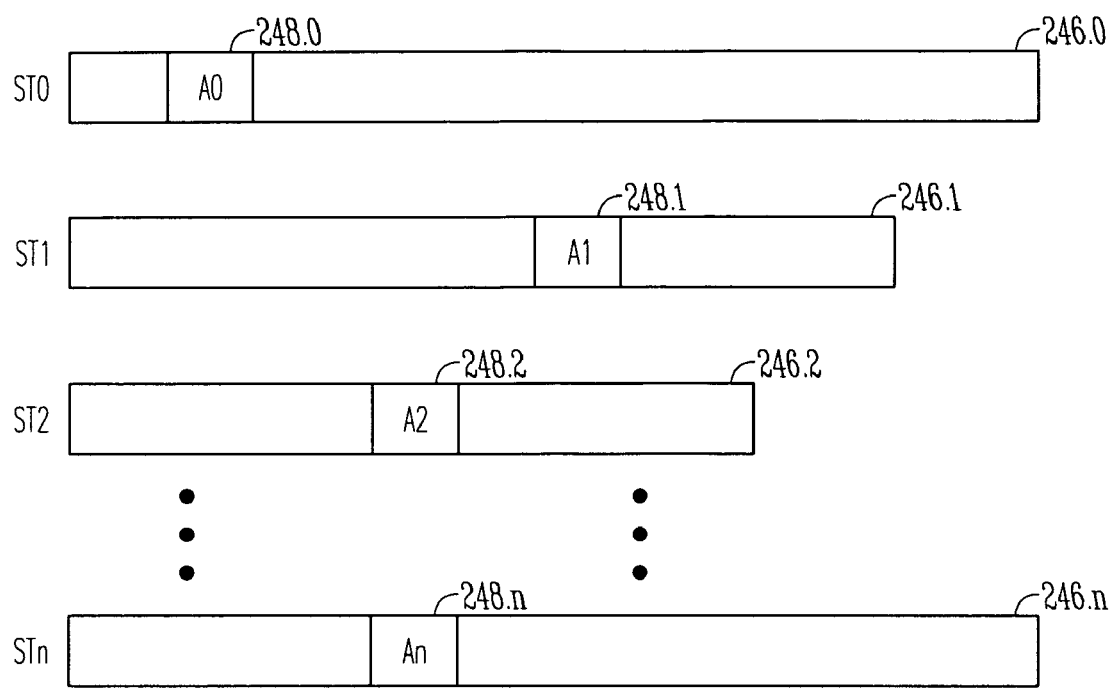
FIG. 7 shows a content classification engine in accordance with an example embodiment.

FIG. 7 shows examples of reference strings (ST0-STn) 246.0-246.n used to identify content in a packet. Each of the strings 246.0-246.n may have one or more associated actions and, when a particular string is identified in an incoming or input packet 240, the specific action may be performed or included within the packet for communication along a communication channel. When configuring the multi-stage filter 244, an anchor string 248.0-248.n is selected or identified in each reference string 246.0-246.n. Each anchor string 248.0-248.n is typically a number of bytes (e.g., 8 bytes) in the particular string and the first processing stage 232 checks for the presence of these anchor strings in the incoming or input packets 240. It is important to note that each anchor string 248.0-248.n may selected at any point in a reference string 246.0-246.n. and is thus not limited to selection as the first or last bytes in a reference string 246.0-246.n. It will be appreciated, as each anchor string 248.0-248.n is only a subset of the corresponding total reference string 246.0-246.n that is being searched for. Further, the first processing stage 232 may merely indicate a likelihood of the particular reference string being present in the packet 240 as only a portion of the reference string is being investigated.

Figure 8:
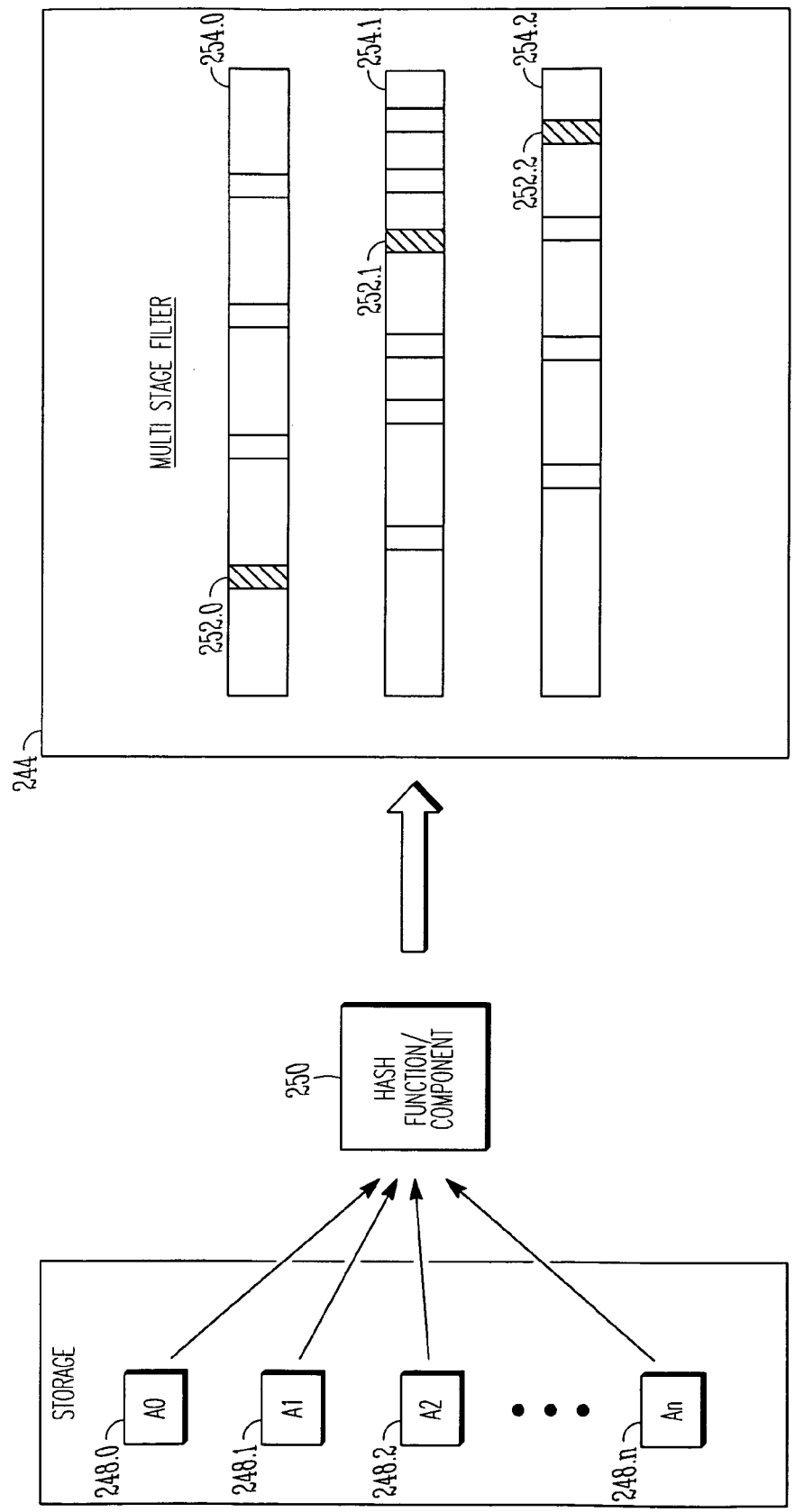
FIG. 8 shows examples of reference strings used to identify content in a packet.

An example of the configuration of the multi-stage filter may be as follows. An anchor string 248.0 may be selected from the reference string 246.0, an anchor string 248.1 may be selected from the reference string 246.1, an anchor string 248.2 may be selected from the reference string 246.2, and an anchor string 248.*n* may be selected from the reference string 246.*n*. Thereafter, as shown in FIG. 8, the anchor strings 248.0-248.*n* are each fed into hash function/component 250 (utilizing the methods 10, 30, 60 and apparatus 50 described above) and each corresponding hash is then mapped to the multi-stage filter 244. A different hash may be used for each array of the multi-stage filter when mapping the anchor strings 248.0-248.*n* to the array. For example, the anchor string 248.0 may be hashed with a first hash and mapped to a location 252.0 in a first array 254.0, hashed with a second hash and mapped to a location 252.1 in a second array 254.1, and hashed with a third hash and mapped to a location 252.2 in a third array 254.2. It will, however, be appreciated that more or less arrays may be provided in different embodiments.

It will thus be appreciated that during initial configuration a "fingerprint" of each anchor string 248.0-248.*n* is created in the multi-stage filter 244 and, as the anchor strings 248.0-248.*n* are extracted from only a portion of the reference strings 246.0-246.*n*, the mapping provided in the multi-stage filter 244 may correspond to more than one reference string. Thus, the mapping of one string may overlap with the mapping of another string and thus querying of the multi-stage filter only provides an indication of a possibility that the data sample corresponds to a reference string. In an example embodiment, the arrays 254.0-254.2 may be 400×1 bit memories and the multi-stage filter 244 may be implemented in SRAM that is provided on chip to enhance processing speeds.

Returning to FIG. 6, as described above, a data sample in each window is selectively extracted or obtained from the input packet 240 and fed through the hash function/component 242 which uses the same hashing function(s) as the hash function/component 250. Accordingly, when the multi-stage filter 244 is queried in the first processing stage 232, it may be determined what the likelihood is that the data sample corresponds to at least one of the reference strings 246.0-246.*n*. In particular, the first processing stage 232 monitors whether or not the data sample potentially corresponds to one of the anchor strings 248.0 to 248.*n*. For example, if the data sample obtained from the input packet 240 corresponds to the anchor string 248.0, then location 252.0, 252.1, 252.2 in the multi-stage filter 244 would be set at "1". However, if any of the bits in locations 252.0, 252.1, and 252.2 are "0" then it may be said with certainty that the data sample does not correspond to any of the reference strings 246.0-246.*n*. Thus, the first processing stage 232 may provide an initial screening stage which does a broad probabilistic analysis or checking to determine whether or not it is worthwhile to perform further or more detailed analysis on the particular data sample.

The example multi-stage filter 244 is shown to include, by way of example, three arrays 254.0-254.2. Accordingly, in an example scenario where each array is four times the maximum string length, the probability of an identified data packet corresponding to a reference string may be (¼)×(¼)×(¼). Thus, although it may not be determined with certainty that the data sample includes one of the reference strings, there is a probability or likelihood that the data sample includes one of the reference strings. Further, it will be appreciated that the probability may be further enhanced by increasing the number of arrays 254.0-254.2. The hash function performed by the hash function/component 242 may be a function of the depth of the multi-stage filter 244.

As mentioned above, if the data sample in the packet matches the data in the multi-stage filter 244, and thus a "signature" of the data sample corresponds with a "signature" of an anchor string 248.0-248.*n* in the multi-stage filter 244, further processing on the particular data sample may be performed by the second processing stage 234. In the example embodiment shown in FIG. 6, an AND function 256 is utilized to determine if the signature of the data sample in the input packet 240 corresponds to the signature of the reference string in the multi-stage filter 244. The functionality described herein may be deployed in hardware and, accordingly, the AND function 256 may be hardwired.

It will be appreciated that if there is no correspondence between the signature of the data sample and the signature in the multi-stage filter 244 generated from the anchor strings 248.0-248.*n*, no further analysis need be performed on the particular sample. It will also be appreciated that the analysis of the data sample need not be done serially and that the content classification engine 218 may include a plurality of first, second and third processing stages 232, 234, 236. Each processing stage may process a data sample of a window located at a different point in the input packet 240. In an example embodiment, points are offset by 1 byte. Further, in the example embodiment shown in FIG. 6, it will be appreciated that the second processing stage 232 is only entered if all of the reference points or locations 252.0-252.2 are "1". If any one of the reference points or locations 252.0-252.2 is "0" there is no correspondence between the signature of the data sample and that provided in the multi-stage filter 244 and no further processing of the particular data sample is required.

By way of example, assuming that the string "John Smith" is included in the input packet 240, the processing by the first processing stage 232 may be as follows. A hash on a minimum window width may be performed by the hash function/component 242 where the minimum window width is equal to L which may be the minimum length among all the strings 246.0-246.*n*. In an example embodiment, the window that may be used to represent a string may be the first L characters in the string. However, it will be appreciated that any number of L consecutive characters can be used for each string. For example, assuming two strings "John Doe" and "John Smith" are provided as reference strings and L is selected as four, then the first four characters of the window into both strings will produce an identical result as both strings commence with "JOHN". Accordingly, as described in more detail below, these two strings may be provided in the same group. However, by selecting the first four characters in the first string and the last four characters in the second string "JOHN" will be provided in a window for the first string and "MITH" will be provided in the second string. Thus, it will be appreciated that various different criteria may be used to select the length of the anchor, which particular portion of the reference string is to define the anchor string, and so on.

In an example embodiment, the multi-stage filter 244 is a simple data structure as described "New Directions in Traffic Measurement and Accounting" by Cristian Estan and George Varghese (UCSD technical report CS2002-0699, February 2002), the contents of which is included herein by reference, and may comprise K arrays of bits (only three example arrays 254.0-254.2 are show in FIGS. 6 and 7). As described above, hash value(s) may be used to compute an index into each of the K arrays of bits. If all the query bits are 1, a possible match is identified and further investigation of the data sample is then required. As described in more detail, the processing in the second processing stage 234 may, optionally, include a different hash function(s). However, if there is a match, it does not necessarily mean that there is a corresponding match in the reference strings database 220 but merely a possibility of such a match occurring. It will be appreciated that by increasing the size of each bitmap and the number of arrays provided in the multi-stage filter 244, false positives may be reduced. False positives may be eliminated subsequent processing stages.

In the second processing stage 234, a second hash function/component 260 is provided to generate a pointer 262 that points to memory such as a bit tree root memory 264. It will be appreciated that, as in the stage of the multi-stage filter 244, the bit root memory 264 requires configuration based on the reference strings in the reference strings database 220.

Thus, an example deployment of the methods 10, 30, and 60 and apparatus 50 is shown in FIGS. 5-8, but it is to be appreciated that the methods 10, 30, 50, and 60 are not limited to this deployment.

Figure 9:
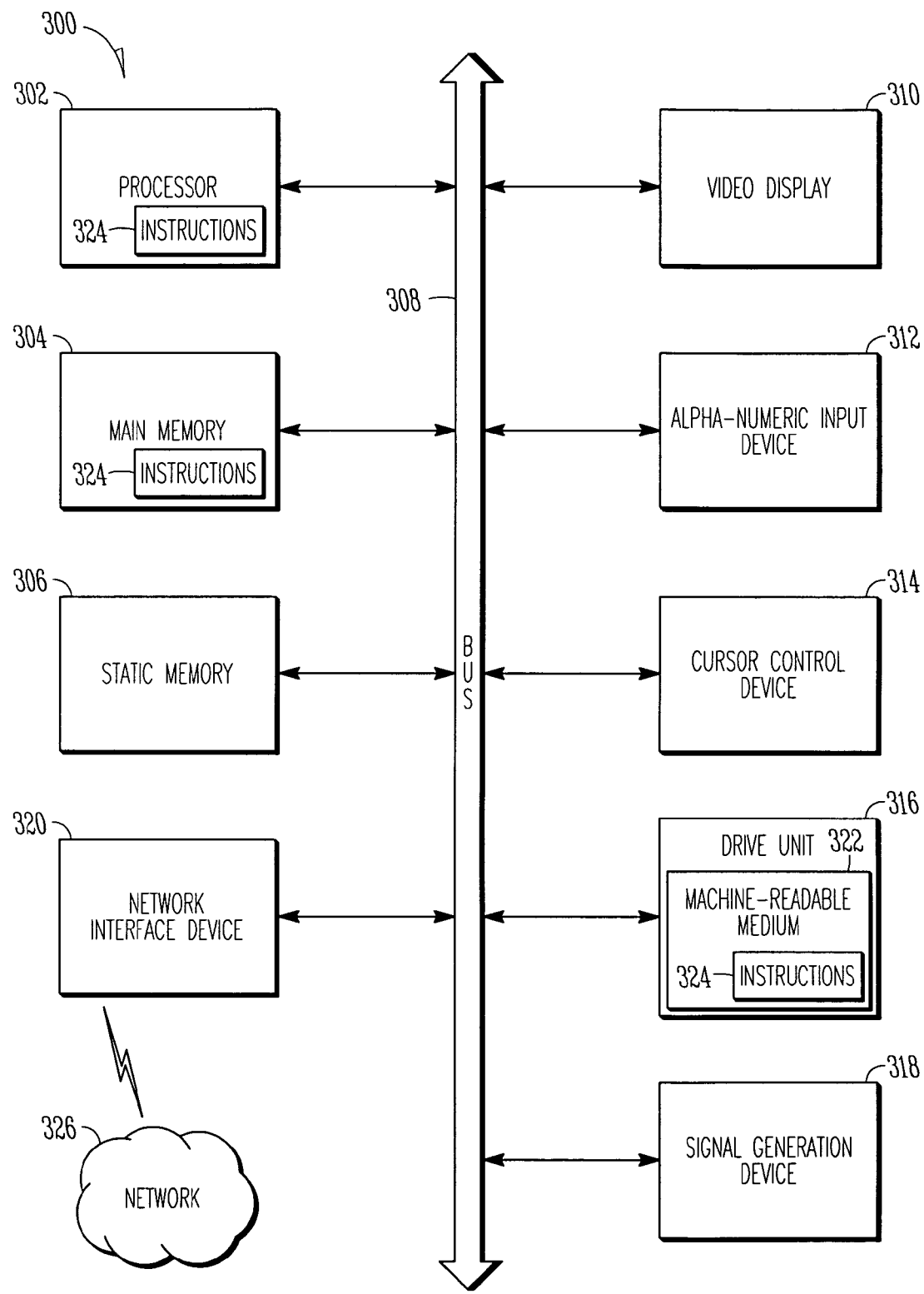
FIG. 9 shows a diagrammatic representation of machine in the example form of a computer system within which a set of instructions, for causing the machine to perform any one or more of the methodologies discussed herein, may be executed.

FIG. 9 shows a diagrammatic representation of machine in the example form of a computer system 300 within which a set of instructions, for causing the machine to perform any one or more of the methodologies discussed herein, may be executed. It will be appreciated that some of the components of the computer system 300 may be omitted in different embodiments. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. One or more components of the machine may be a personal computer (PC), a tablet PC, a set-top box (STB), a Personal Digital Assistant (PDA), a cellular telephone, a web appliance, a network router, switch or bridge, a port card, a line card, a service card or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media and magnetic media.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of performing an incremental hash function on a data string, the method comprising:
  using a processor to perform at least a portion of one or more of the following acts:
  receiving the data string over a network at a network interface device, the data string including a plurality of data samples $B_0$ to $B_j$, wherein represents a number of data samples that are received in parallel;
  defining a moving window of length wl within the data string;
  as the plurality of data samples are received, calculating and maintaining a corresponding plurality of hash values $H_0$ to $H_j$, one hash value for each data sample that can be received in parallel;
  wherein calculating the plurality of hash values includes:
  defining a hash multiplier constant to be k;
  calculating a first hash value $H_0$ by adding a first data sample $B_0$ to a last hash value $H_j$, and by subtracting a data sample that was received wl bytes previously multiplied by $k^{wl}$;
  calculating a second hash value $H_1$ by adding the first data sample $B_0$ multiplied by k and a second data sample $B_1$ to the last hash value $H_j$, by subtracting the data sample that was received wl bytes previously multiplied by $k^{wl+1}$, and by subtracting a data sample received wl+1 bytes previously multiplied by $k^{wl}$;
  calculating the last hash value $H_j$ by adding the correspondingly multiplied values of the first data samples to the last hash value $H_j$, and by subtracting the correspondingly multiplied values of bytes received from wl to wl+previously;
  combining the calculated first hash value through last hash value into a result;
  using the result to identify content in the form of a particular reference string; and
  performing a particular action based upon the particular reference string.

2. The method of claim 1, which comprises:
  storing the data samples in parallel in an array including a plurality of segments; and
  when sufficient data samples are present in the array, performing the calculating and maintaining of the plurality of hash values in parallel on each segment of the array.

3. A machine readable-medium embodying instructions which, when executed by a machine, cause the machine to perform the method of claim 1.

4. Apparatus to perform an incremental hash function on a data string, the apparatus comprising:
- at least one processor; and
- a memory including instructions which, when executed, provide a modified hash function module to receive the data string including a plurality of data samples $B_0$ to $B_1$, wherein represents a number of data samples that are received in parallel, wherein a moving window of length wl is defined with the data string, and wherein, as the plurality of data samples are received, the modified hash function module calculates and maintains a corresponding plurality of hash values $H_0$ to $H_f$, one hash value for each data sample that can be received in parallel;
- wherein calculating the plurality of hash values includes:
- defining a hash multiplier constant to be k;
- calculating a first hash value $H_0$ by adding a first data sample $B_0$ to a last hash value $H_f$, and by subtracting a data sample that was received wl bytes previously multiplied by $k^{wl}$;
- calculating a second hash value $H_1$ by adding the first data sample $B_0$ multiplied by k and a second data sample $B_1$ to the last hash value $H_f$, by subtracting the data sample that was received wl bytes previously multiplied by $k^{wl+1}$, and by subtracting a data sample received wl+1 bytes previously multiplied by $k^{wl}$;
- calculating the last hash value $H_f$ by adding the correspondingly multiplied values of the first data samples to the last hash value $H_f$, and by subtracting the correspondingly multiplied values of bytes received from wl to wl+previously;
- combining the calculated first hash value through last hash value into a result;
- using the result to identify content in the form of a particular reference string; and
- performing a particular action based upon the particular reference string.

5. The apparatus of claim 4, wherein:
- the data samples are stored in parallel in an array including a plurality of segments; and
- when sufficient data samples are present in the array, the calculating and maintaining of the plurality of hash values is performed in parallel on each segment of the array.

6. Apparatus to perform an incremental hash function on a data string, the apparatus comprising:
- at least one processor; and
- memory including instructions which, when executed, provide modified hash function means to receive the data string including a plurality of data samples $B_0$ to $B_f$, wherein represents a number of data samples that are received in parallel, wherein a moving window of length wl is defined with the data string, and wherein, as the plurality of data samples are received, the modified hash function means calculates and maintains a corresponding plurality of hash values $H_0$ to $H_f$, one hash value for each data sample that can be received in parallel;
- wherein calculating the plurality of hash values includes:
- defining a hash multiplier constant to be k;
- calculating a first hash value $H_0$ by adding a first data sample $B_0$ to a last hash value $H_f$, and by subtracting a data sample that was received wl bytes previously multiplied by $k^{wl}$;
- calculating a second hash value $H_1$ by adding the first data sample $B_0$ multiplied by k and a second data sample $B_1$ to the last hash value $H_f$, by subtracting the data sample that was received wl bytes previously multiplied by $k^{wl+1}$, and by subtracting a data sample received wl+1 bytes previously multiplied by $k^{wl}$;
- calculating the last hash value $H_f$ by adding the correspondingly multiplied values of the first data samples to the last hash value $H_f$, and by subtracting the correspondingly multiplied values of bytes received from wl to wl+previously;
- combining the calculated first hash value through last hash value into a result;
- using the result to identify content in the form of a particular reference string; and
- performing a particular action based upon the particular reference string.

7. The apparatus of claim 6 further comprising means for defining a hash value of the data string as a new hash value.

* * * * *

UNITED STATES PATENT AND TRADEMARK OFFICE
CERTIFICATE OF CORRECTION

PATENT NO. : 7,783,688 B2  Page 1 of 1
APPLICATION NO. : 11/271134
DATED : August 24, 2010
INVENTOR(S) : John D. Huber It is certified that error appears in the above-identified patent and that said Letters Patent is hereby corrected as shown below:

In column 10, line 31, in Claim 1, after "wherein" insert -- I --.

In column 10, line 51, in Claim 1, delete "$H_1$by" and insert -- $H_I$ by --, therefor.

In column 10, line 52, in Claim 1, after "first" insert -- I --.

In column 10, line 55, in Claim 1, delete "wl+previously;" and insert -- wl+I previously; --, therefor.

In column 11, line 9, in Claim 4, delete "$B_1$," and insert -- $B_I$, --, therefor.

In column 11, line 10, in Claim 4, after "wherein" insert -- I --.

In column 11, line 30, in Claim 4, after "first" insert -- I --.

In column 11, line 33, in Claim 4, delete "wl+previously;" and insert -- wl+I previously; --, therefor.

In column 12, line 10, in Claim 6, after "wherein" insert -- I --.

In column 12, line 30, in Claim 6, after "first" insert -- I --.

In column 12, line 33, in Claim 6, delete "wl+previously;" and insert -- wl+I previously; --, therefor.

Signed and Sealed this

Sixteenth Day of November, 2010

David J. Kappos
*Director of the United States Patent and Trademark Office*